METHODS AND CIRCUITRIES FOR TRANSMITTING A COLOR TELEVISION SUB-CARRIER

Filed Aug. 31, 1961

United States Patent Office 3,213,191

Patented Oct. 19, 1965

3,213,191

METHODS AND CIRCUITRIES FOR TRANSMITTING A COLOR TELEVISION SUB-CARRIER

Henri de France and Pierre Cassagne, both of Paris, France, assignors to Compagnie Francaise de Television, a corporation of France Filed Aug. 31, 1961, Ser. No. 135,305
Claims priority, application France, Sept. 9, 1960, 838,163
15 Claims. (Cl. 178—5.4)

The present invention relates to color television systems, more particularly of the so-called simultaneous-sequential type, wherein a carrier wave is modulated, on one hand, by a permanently transmitted information, for instance a luminance signal, and on the other hand, by a sub-carrier, which is itself modulated, alternately, by two chrominance informations, the alternation being effected at the line frequency.

It is known that this transmission mode, whose advantages are well known, presents however certain disadvantages: visibility of the sub-carrier on the images delivered by the monochrome receivers, recurrent interference patterns on the images delivered on the color receiver.

The present invention has for its object a method enabling to substantially eliminate the above disadvantages in the system of the above mentioned type using an interlaced scanning, i.e. successive scanning of the "odd lines" and of the "even lines," the total number of lines in a complete image being $2p+1$, where $p$ is an integer.

Another object of the invention is to provide systems suitable for carrying out this method.

According to the invention, a phase structure, or pattern, is assigned to the modulated chrominance sub-carrier, consisting of a correlation with the line scanning, as modified by two series of $\pi$-phase-shifts.

By phase "pattern" or "structure" is meant the variation of the phase of the sub-carrier as a function of the point of the image which is being scanned, this being an important factor as concerns the visibility of the sub-carrier on the screen of the monochrome receivers.

The invention will be best understood from the following description and appended drawings, wherein.

Figure 5:
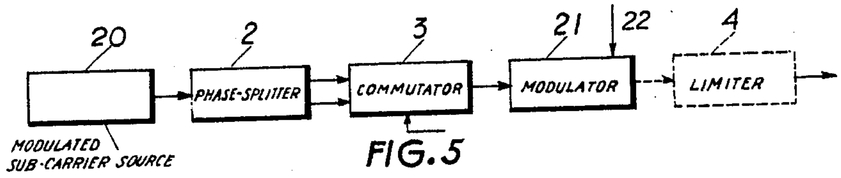
FIG. 5 is an alternative embodiment of a portion of FIG. 4.

According to the method of the invention, a phase pattern is assigned to the chrominance sub-carrier, consisting of a correlation with the line scanning, as modified by two series of superimposed $\pi$ phase-shifts. The correlation is such that the phase of the modulated sub-carrier for a given image point depends only upon the abscissa of this point on the horizontal scanning line to which it belongs, and possibly upon the modulating signal along this line, and not upon the position in space or time of this scanning line. This condition is fulfilled if, in the absence of any phase-shifts, the sub-carrier has a fixed value at the beginning of each scanning line.

By position in space is meant the position of the line considered in the image, and by position in space, the rank of the scanning line in the successive scanning of the horizontal lines. The abscissa of a point along the horizontal line to which it belongs, i.e. its distance to the beginning of this line, will be hereinafter simply called the "abscissa" of this point.

The phase-shifts of the first series bear on some of the scanning lines according to a periodic law, and the phase-shifts of the second series bear on one out of two successive fields. By a phase shift bearing on one line, or on a field, is meant that the phase of the sub-carrier is shifted for the duration of that line, or of that field, in other words that its phase is reversed for the duration of that line, or of that field, since all the phase-shifts considered here are phase-shifts by $\pi$.

Each of the phase-shifts of the first series bears on a whole number equal to or greater than 1 of lines and the periodic law followed to effect them is such that these phase-shifts are effected in the same way in the successive groups of P successive scanning lines, where P is a divisor of $p$ if $p$ is an even number, and a divisor of $p+1$ if $p$ is an odd number.

A compensation is thus achieved between two adjacent lines on the image, modulated by the same chrominance signal and pertaining to two successive fields.

It must be noted that, taken alone, i.e. without the two series of phase-shifts, the phase correlation to be established according to the method of the invention, would have this result that, at least for the same predetermined modulating signal along all the scanning lines, the phase of the modulated sub-carrier wave would be the same for points having the same abscissa on any two scanning lines, so that all the scanning lines could then be said to be in phase coincidence.

Thereafter and for the sake of simplifying the language, a scanning line will be said to have a "zero-phase" if it has not been subjected to any $\pi$-phase-shift of either series, a $\pi$-phase-shift converting a "zero-phase" into a "$\pi$-phase," and a second $\pi$-phase-shift converting a "$\pi$-phase" again into a "zero-phase." Zero or $\pi$ according as a line has a "zero-phase" or a "$\pi$-phase" will be said to be the phase of this line.

Two scanning lines will be said to be in phase coincidence if they both have a "zero-phase" or if they both have a "$\pi$-phase." They will be said to be in phase opposition if one has a zero phase, and the other a $\pi$-phase.

The above mentioned compensation is obtained because the first of phase-shifts results in phase coincidence of two lines modulated by the same chrominance information, belonging to two successive fields and occupying adjacent positions on the image, the second series of phase-shifts converting the phase coincidence of two such lines into a phase opposition.

The choice indicated for the P scanning line period will be explained hereinafter.

The total number of lines in a complete image being $2p+1$, $p$ is the number of the even lines of the image, and $p+1$ the number of the odd lines.

Two cases are to be considered, according as $p$ itself is an even number or an odd number.

If $p$ is an even, $p+1$ is odd, and therefore the first line of an even field (assuming, as may always be done, that the odd lines constitute the odd fields, and that the even lines constitute the even fields) will be modulated by the chrominance information other than that modulating the first line of the preceding odd field, and by the same chrominance information as that modulating the first line of the subsequent odd field. In this case, to obtain the desired preliminary result by means of the first series of phase-shifts, it is necessary and sufficient that the $p$ lines of an even field should have the same phases as the $p$ last lines of the preceding odd field, respectively, and also the same phases as the $p$ first lines of the subsequent odd field, respectively, these conditions are fulfilled if P is a divisor of $p$.

If $p$ is odd, $p+1$ is even. In that case the chrominance information modulating the first line of an even field is the same as the chrominance information modulating the first line of the preceding odd field, whereas the first line of the subsequent odd field is modulated by the other chrominance information. The required preliminary result will be obtained if the $p$ lines of an even field have the same phases as the first $p$ lines of the preceding odd field respectively, and also the same phases as the last $p$ lines of the subsequent odd field, respectively. These conditions are fulfilled if P is a divisor of $p+1$. Under these conditions, the required preliminary result is obtained. The second phase-shift series then converts into phase-opposition the phase-coincidence thus obtained for two adjacent lines modulated by the same information and belonging to two successive fields.

This result would of course also be obtained by making $P=1$, which is tantamount to dispensing with the first phase-shift series. But this would lead to having the same phase for all the lines of a field, which would be a disadvantage, whereas the general law indicated hereinabove makes it possible to select P (among the divisors of $p$ or $p+1$ according as $p$ is even or odd), and the phase structure of each of the successive groups of P scanning lines, so as to obtain, also, a compensation within each of the successive fields and a more satisfactory overall result.

It may be noted that $P=2$ always gives the indicated compensation between adjacent fields, since 2 is a divisor of $p$ if $p$ is even, and a divisor of $p+1$ if $p$ is odd.

But it is preferred to select P different from 2, $P=2$ leading to put into phase-coincidence all the lines modulated by the same chrominance information within the same field.

A satisfactory overall result may for example be obtained with groups of 3 or 4 lines, the phase-shifts of the first series bearing only on the last line of each of these groups, i.e. 2 or 3 lines with a zero-phase followed by 1 line with a $\pi$-phase. Of course this requires that 3 or 4 is one of the possible values for P.

It may be seen that 4 is a possible value for P if the total number of lines is $8n\pm1$ (corresponding to $p=4n$ or $4n-1$) and that 3 is a possible value of the total number of lines is $12n\pm1$ (corresponding to $p=6n$ or $6n-1$), $n$ being any integer.

This simple law within each group, i.e. with a phase-shift bearing only on the last line of the group, is not advantageous if P is too high, because it leads to a too great number of zero-phases relative to the $\pi$-phases or vice versa within a field.

Considering for instance the case of an image with 525 lines, $p=262$ which is even and divisible without remainder only by 2 and 131. As it is preferred to avoid 2, only 131 remains. In that case each group of 131 successive scanning lines may be, for instance, divided into 43 sub-groups of 3 lines, each of the sub-groups comprising two zero-phases and one $\pi$-phase, a 44th sub-group remaining incomplete, or into 32 sub-groups of 4 lines, each of the sub-groups comprising three zero-phases and one $\pi$-phase, a 33rd sub-group remaining incomplete.

A high value of P is always possible, as if $p$ is even, $p/2$ is a divisor of $p$, and if $p$ is odd, $$\frac{p+1}{2}$$

is a divisor of $p+1$.

Of course other solutions are possible according to the choice offered by the possible P values.

By way of example, the following table shows the phase-structure obtained in the case where the number of image lines is $8n+1$ ($p=4n$) and the period of the first phase-shift series is $P=4$, each group of P scanning lines in the absence of the second phase-shift series comprising three "zero-phases" and one "$\pi$-phase":

| No. Line | Field | | | | | | | | |
|---|---|---|---|---|---|---|---|---|---|
| | 1 | 2 | 3 | 4 | 5 | 6 | 7 | 8 | 9 |
| 1 | R0 | | B0 | | R0 | | B$\pi$ | | R0 |
| 2 | | B$\pi$ | | R$\pi$ | | B0 | | R$\pi$ | |
| 3 | B0 | | R0 | | B$\pi$ | | R0 | | B0 |
| 4 | | R$\pi$ | | B0 | | R$\pi$ | | B$\pi$ | |
| 5 | R0 | | B$\pi$ | | R0 | | B0 | | R0 |
| 6 | | B0 | | R$\pi$ | | B$\pi$ | | R$\pi$ | |
| 7 | B$\pi$ | | R0 | | B0 | | R0 | | B$\pi$ |
| 8 | | R$\pi$ | | B$\pi$ | | R$\pi$ | | B0 | |
| 9 | R0 | | B0 | | R0 | | B$\pi$ | | R0 |

In the table the number of lines shown has been reduced to 9.

Each of the rows of the table corresponds to an image line and each column to a field.

Each of the filled squares of the table corresponds to a scanned line. 0 and $\pi$ indicate whether it is a line with a "zero-phase" or a "$\pi$-phase," and R and B indicate whether it is modulated by the first chominance information (R) or the second chrominance information (B).

The ninth row of the table is identical with the first row and the ninth column is identical with the first column, the whole process repeating itself for each set of 8 successive rows and the $(8n+1)$th row being identical to the first row, and for each set of 8 successive columns.

It may be added that in order to simplify the language, the facts have been stated as though the odd fields had one line more than the even fields, whereas it is general use to constitute each field with $$p+\frac{1}{2}$$

lines. It is obvious that what has been said remains true in that case; it suffices to neglect what happens to the half line missing in the real scanning to terminate the scanning of the odd fields such as assumed hereinabove.

The compensation obtained through phase opposition of lines modulated by the same chrominance information is most satisfactory when the phase of the sub-carrier wave is not affected by the modulating signal, i.e. in the case of amplitude modulation. In this case, the "phase-coincidence" or "phase-opposition" referred to hereinabove is a phase coincidence or a phase opposition in the general sense of the term.

When the phase of the sub-carrier wave is modified by the modulating signal, as is the case with frequency or phase modulation, the phase relation between the phase of the sub-carrier wave and the abscissa of the considered point of the image has a predetermined expression only for a predetermined modulating signal along the line to which it belongs.

But experience has shown and, taking into account the structure of the video modulating signal, theory confirms, that such a limited phase correlation allow a satisfactory compensation to be obtained by means of the two indicated phase-shift series.

This results from the known fact that any picture signal, and in partcular one or the other of the two chrominance signals transmitted by means of the sub-carrier, without, of course, being identical along successive scanning lines, has however a tendency to repeat itself from one line to the other.

The method according to the invention may be carried out in two ways according as the phase shifts are effected on the unmodulated or on the modulated sub-carrier wave.

According to the first way, a modulatd sub-carrier wave with the required phase correlation is first generated.

This being done, the two phase-shift series are simultaneously applied to the phase-correlated modulated subcarrier wave, i.e. the first phase-shift series is applied during the first field, at the end of which the first phase-shift of the second series is applied for the whole duration of the second field, while the first phase-shift series is going on independently. At the end of the third field a new "field phase-shift" is applied bearing on the whole of the fourth field and so on.

According to the second manner, which, as may readily be seen, gives the same final result, an unmodulated subcarrier wave, the phase of which for a given point of the image depends only upon the abscissa of this point, is first generated, then subjected to the two phase-shift series in the same way as the modulated sub-carrier was in the first case, and finally modulated.

Figure 1:
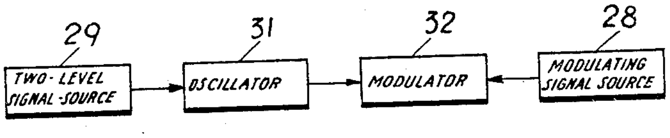
FIG. 1 is a phase-correlating system, adapted to be used in the method of the invention.

FIG. 1 shows a circuit adapted for providing a subcarrier wave modulated by the chrominance signals and presenting the desired phase relation with the line scanning; this circuit comprises an oscillator 31 generating the non modulated sub-carrier and a modulator 32 connected to the output of oscillator 31.

A two-level signal source 29 is connected to oscillator 31 and the modulating signal source 28 is connected to modulator 32.

The operation of this circuit will be explained with reference to FIG. 2 where the two-level signal B supplied by source 29 is represented.

Figure 2:
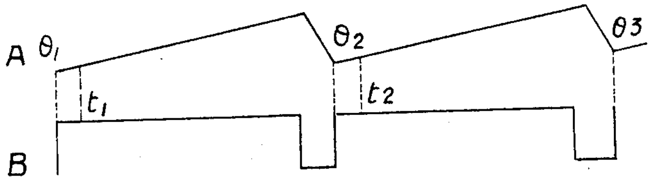
FIG. 2 is a diagram showing the operation of the system in FIG. 1.

This signal is synchronized with the line scanning sawtooth waves A of FIG. 2, used in the cameras, so that the rising front of signal 8 coincides in time at instants $\theta i$ ($i$=1,2,3, etc. . . .) with the beginning of the less steep portions of the saw-tooth signals (assumed here to be the upward going portions), the higher level portions of signal B having a duration at least as long as the upward portions of the saw-teeth and, for example, evactly the same duration, as represented in the figure.

In order to render the figure clearer, the downward going portions of signal A have been represented much longer than they really are relative to the upward going portions.

Those steeper portions of the saw-tooth wave correspond, as is well known, to time intervals during which the modulating signal is not used.

The deriving of signal B from signal A may be performed by means well known in the art.

These signals B are applied to an electrode of oscillator 31 so as to unblock it while they are at their higher level and to block it while they are at their lower level.

It is known that, after such blocking periods the oscillator starts with a phase which is well defined with respect to the release signal.

More precisely, at an instant $ti$ (FIG. 2) separted from $\theta i$ by a constant time interval at least equal to the duration of the transient (this interval which is in reality negligible being represented grossly exaggerated on the drawing) the oscillator has a well defined phase $\phi$ independent of $i$.

This result is obtained provided the rising time of the release signal B is not too long relative to the period of the oscillation produced by the generator.

By way of example, for an oscillation frequency of 4 mc./s., this system may be used with a rising time of signal B equal to 0.2/$\mu$s.

The sub-carrier wave thus chopped, as well as the modulating signal delivered by source 28, are applied to modulator 32.

As may readily be seen, the modulated sub-carrier wave thus obtained complies with the phase correlation condition stated hereinabove, whatever the type-amplitude, frequency or phase—of modulation.

Moreover, it will be noted that the inactive or dead times during which the modulated wave is interrupted, due to the blocking action of signal B, correspond to time intervals during which the modulating signal is not used.

Figure 3:
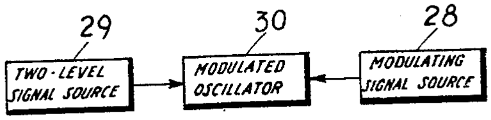
FIG. 3 is an alternative embodiment of the system in FIG. 1.

In the case where the sub-carrier wave is generated directly as a modulated wave, i.e. where the means for producing the modulated wave comprises a modulated oscillator 30, the two-level phase-signals delivered by source 29, as well as the modulating signals delivered by source 28 are applied to the modulated oscillator 30, either on the same input, or on two distinct inputs, according to the block diagram in FIG. 3.

It should be noted that the systems in FIGS. 1 and 3 may be used for obtaining a modulated wave presenting successive phase correlations of the type indicated, with a sequence of any given signals, provided these are preliminarly converted into two-level signals, in phase with the initial signals.

The above described systems require that the frequency of the sub-carrier should not be subjected to any fluctuations due to imperfections of the oscillator 31 or the modulated oscillator 30.

In the case of an amplitude or phase modulated subcarrier, the phase correlation may also be obtained very simply by selecting a sub-carrier the frequency of which is a multiple of the line scanning frequency, which may then be derived through successive divisions of the subcarrier frequency.

The means for producing the modulated sub-carrier wave with the required phase correlation is then simply a modulated oscillator, or a modulator fed by a subcarrier generator.

To operate in this way would be much less interesting if the sub-carrier were frequency modulated, and, as is generally done, directly generated as a modulated wave by means of a modulated oscillator, from which it would then be impossible to derive, in the indicated way, a line scanning frequency having with the center frequency of the modulated oscillator the required relation.

Figure 4:
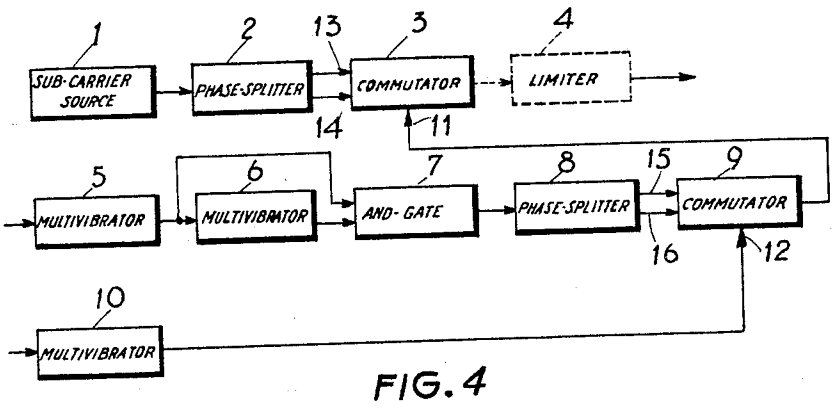
FIG. 4 illustrates one embodiment of the circuit for carrying out the method of the invention.

FIG. 4 shows an embodiment of the invention in which it is assumed that the number of lines of the complete image is of the form $8n\pm1$, where $n$ is any integer, in which case, as has been said before, P=4 may be selected for the period of the phase-shifts of the first series.

It is moreover assumed that the $\pi$-phase-shifts of the first series bear on the last line of each of the successive groups of P scanning lines, giving the phase structure 0 0 0. $\pi$. to each group.

In FIG. 4, 1 represents a system providing a modulated sub-carrier having the required phase-relation with the line scanning, for example, one of the above indicated systems.

The output of source 1 is connected to a phase-splitter 2, consisting, for instance, of a tube having two outputs, one on the cathode and the other on the anode, delivering the input signals respectively without phase-shift and with a $\pi$-phase-shift. These two outputs are connected to two signal inputs 13 and 14 of an electronic commutator 3 connecting its output to one or the other of its two signal inputs under the control of the signal applied to its control input 11.

In the case of frequency or phase modulation, commutator 3 is followed by an amplitude limiting device 4, which may be dispensed with in the case of an amplitude modulation and is shown in the figure in dotted lines.

A bistable multivibrator 5, controlled on its input by the synchronization signals at the line frequency, is connected, on one hand, to a second bistable multivibrator 6 and, on the other hand, to one of the inputs of an and-gate 7, the second input of which is connected to the output of the bistable multivibrator 6. Gate 7 feeds a phase-splitter 8, delivering at two distinct outputs, signals having respectively the same polarity as its input signals and the reverse polarity. The outputs of phase-splitter 8 are connected to the two signal inputs of an electronic commutator 9 connecting its output to one or the other of its two signal inputs 15 and 16 under the control of the signal applied to its control input 12.

Finally, a bistable multivibrator 10 controlled by the synchronizing signals at the field frequency delivers to the control input 12 of commutator 9 a square wave at half the field frequency.

The operation of the system is readily understood.

For a given polarity, i.e. during one out of two fields, of the signal applied to control input 12 of commutator 9, the latter connects its output permanently to a corresponding one of its inputs.

On the other hand, multivibrator 5 to which are applied the short pulses at the line frequency delivers a rectangular wave, each of the higher level portions and each of the lower level portions of which has a duration equal to that of one line. Mulitvibrator 6 delivers, in turn, a rectangular wave, each of the higher level portions and each of the level portions of which corresponds to two successive scanning lines.

The and-gate 7 thus delivers a rectangular wave, each of the higher level portions of which corresponds to one scanning line, each of the lower level portions corresponding to three successive scanning lines.

Phase-splitter 8 delivers, at one of its output, a rectangular wave of the same type, and at its second output, the reverse wave, whose higher level portions correspond to three successive scanning lines and whose lower level portions correspond to one scanning line.

During one out of two fields, commutator 9 connects its input 15 to its output and during the following field it connects its input 16 to its output, under the control of the output signal of the bistable multivibrator 10.

The output signals of commutator 9 applied to the control input 11 of commutator 3, enable the indicated phase-shifting law to be obtained at the output of commutator 3.

According to the second manner in which the method of the invention may be performed, an unmodulated sub-carrier is first generated the phase of which corresponding to a given point of the image, is only a function of the abscissa of this point along the horizontal line to which it belongs.

It is readily seen that the phase correlating system of FIG. 1, reduced to the rectangular signal source 29 and oscillator 31, may be used to generate such a phase-correlated unmodulated carrier wave.

In the case of amplitude or phase modulation, the phase-correlated unmodulated sub-carrier wave may also be obtained by selecting a sub-carrier frequency which is a multiple of the line scanning frequency and deriving the line scanning frequency from the sub-carrier frequency as indicated above.

FIG. 5 shows how the circuit of FIG. 4 may be modified in this case for applying the same two phase-shift series.

The source 1 of FIG. 4 is substituted by a source 20—for example one of those previously inidcated—delivering an unmodulated phase-correlated sub-carrier wave, whilst a modulator 21, fed on its input 22 by the modulating signals, is connected to the output of commutator 3, limiter 4, in the case of frequency or phase limitation, being connected to the output of modulator 21. The remainder of the circuit is as shown in FIG. 4.

It is to be understood that the invention is not limited to the embodiments described and illustrated, given only by way of example. In particular, the adaptation of the described circuit to the case where the phase-shifts of the first series are effected according to a different periodic law is within reach of those skilled in the art.

What is claimed, is:

1. A method for reducing the visibility of the sub-carrier in color television systems wherein a sub-carrier is alternately modulated by two chrominance informations, the alternation taking place at the line frequency, the total number of lines of the complete image being $2p+1$, where $p$ is an integer, and the scanning being interlaced, said method comprising the steps of: (a) generating a sub-carrier wave having a fixed phase at the beginning of each scannnig line; (b) alternately modulating said sub-carrier wave by said two chrominance informations, the alternation occurring at the line frequency; (c) reversing the phase of said sub-carrier wave for the respective durations of $v$ predetermined lines within each of all the successive groups of P successive scanning lines, P being an integer greater than 2 and being a divisor of $p$ if $p$ is an even number and a divisor of $p+1$ if $p$ is an odd number, $v$ being a positive integer smaller than P, and said predetermined lines occupying the same relative positions within each of said groups and (d) reversing the phase of said sub-carrier wave for the duration of one out of two successive fields the phase reversings of steps (d) being superimposed on those of step (c).

2. A method for reducing the visibility of the sub-carrier in color television systems wherein a sub-carrier is alternately modulated by two chrominance informations, the alternation taking place at the line frequency, the total number of lines of the complete image being $8n\pm1$, where $n$ is an integer, and the scanning being interlaced, said method comprising the steps of: (a) generating a sub-carrier wave having a fixed phase at the beginning of each scaning line; (b) alternately modulating said sub-carrier wave by said two chrominance informations, the alternation taking place at the line frequency; (c) reversing the phase of said sub-carrier wave for the duration of the fourth line of each successive group of four successive scanning lines; and (d) reversing the phase of said sub-carrier for the duration of one out of two successive fields, the phase reversings of step (d) being superimposed on those of step (c).

3. A method for reducing the visibility of the sub-carrier in color television systems wherein a sub-carrier is alternately modulated by two chrominance informations, the alternation taking place at the line frequency, the total number of lines of the complete image being $12n\pm1$, where $n$ is an integer, and the scanning being interlaced, said method comprising the steps of: (a) generating a sub-carrier wave having a fixed phase at the beginning of each scanning line; (b) alternately modulating said sub-carrier wave by said two chrominance informations, the alternation taking place at the line frequency; (c) reversing the phase of said sub-carrier wave for the duration of the third line of each successive group of three successive scanning lines; and (d) reversing the phase of said sub-carrier for the duration of one out of two successive fields, the phase reversings of step (d) being superimposed on those of step (c).

4. A method for reducing the visibility of the sub-carrier in color television systems wherein a sub-carrier is alternately modulated by two chrominance informations, the alternation taking place at the line frequency, the total number of lines of the complete image being $2p+1$, where $p$ is an integer, and the scanning being interlaced, said method comprising the steps of: (a) generating a sub-carrier wave having a fixed phase at the beginning of each scanning line; (b) alternately modulating said sub-carrier wave by said two chrominance informations, the alternation taking place at the line frequency; (c) reversing the phase of said sub-carrier wave for the respective durations of $v$ predetermined scanning lines within each of all the successive groups of P successive scanning lines, P being a divisor of $p$ if $p$ is an even number and a divisor of $p+1$ if $p$ is an odd number, said divisor P being of the form $3q+r$, wherein $q$ and $r$ are positive integers and $r<3$, each group of P scanning lines being divided into $q$ complete sub-groups of three scanning lines and an incomplete sub-group of $r$ scanning lines, and said $v$ predetermined lines being the respective third lines of each complete sub-group; and (d) reversing the phase of said sub-carrier for the duration of one out of two successive fields the phase reversings of step (d) being superimposed on those of step (c).

5. A method for reducing the visibility of the sub-carrier in color television systems wherein a sub-carrier is alternately modulated by two chrominance informations, the alternation taking place at the line frequency, the total number of lines of the complete image being $2p+1$, where $p$ is an integer, and the scanning being interlaced, said method comprising the steps of: (a) generating a sub-carrier wave having a fixed phase at the beginning of each scanning line; (b) alternately modulating said sub-carrier wave by said two chrominance informations, the alternation taking place at the line frequency; (c) reversing the phase of said sub-carrier wave for the respective durations of $v$ predetermined scanning lines within each of all the successive groups of P successive scanning lines, P being a divisor of $p$ if $p$ is an even number and a divisor of $p+1$ if $p$ is an odd number, said divisor P being of the form $4q+r$, wherein $q$ and $r$ are positive integers and $r<4$, each group of P scanning lines being divided into $q$ complete sub-groups of four scanning lines and an incomplete sub-groups of $r$ scanning lines, and said $v$ predetermined lines being the respective fourth lines of each complete sub-group; and (d) reversing the phase of said sub-carrier for the duration of one out of two successive fields the phase reversings of step (d) being superimposed on those of step (c).

6. In a color television system wherein the total number of lines of the complete image is $2p+1$, $p$ being an integer, and wherein the scanning is interlaced, a color television transmitter sub-carrier circuit comprising in series: means for generating a sub-carrier wave having a frequency equal to a whole multiple of the line frequency; means for (i) shifting by $\pi$ the phase of said sub-carrier wave for the respective durations of $v$ predetermined scanning lines in each of all the successive groups of P successive scanning lines, P being an integer greater than 2 and being a divisor of $p$ if $p$ is an even number and a divisor of $p+1$ if $p$ is an odd number, $v$ being a positive integer smaller than P, and said $v$ predetermined lines occupying the same relative positions within each of said groups, and (ii) additionally shifting by $\pi$ the phase of said sub-carrier wave for the duration of one out of two successive fields; and means for alternately modulating said sub-carrier by two alternate chrominance informations, the alternation taking place at the line frequency.

7. In a color television system wherein the total number of lines of the complete image is $2p+1$, $p$ being an integer, and wherein the scanning is interlaced a color television transmitter sub-carrier circuit comprising: frequency modulating means for providing a sub-carrier wave alternately modulated by two chrominance informations, the alternation taking place at the line frequency, and means coupled to said frequency-modulating means for imparting a fixed phase to said modulated sub-carrier wave at the beginning of each scanning line; means for (i) shifting by $\pi$ the phase of said modulated sub-carrier wave for the respective durations of $v$ predetermined scanning lines of each of all the successive groups of P successive scanning lines, P being an integer greater than 2 and being a divisor of $p$ if $p$ is an even number and a divisor of $p+1$ if $p$ is an odd number, $v$ being a positive integer smaller than P, and said $v$ predetermined lines occupying the same relative positions within each of said groups. and (ii) additionally shifting by $\pi$ the phase of said modulated sub-carrier wave for the duration of one out of two successive fields.

8. A color television transmitter circuit as claimed in claim 7, wherein said frequency modulating means comprise an oscillator having a frequency control input and means for applying said chrominance informations to said frequency control input, and wherein said means for imparting a fixed phase to said modulated sub-carrier wave at the beginning of each scanning line comprise means for successively blocking and unblocking said oscillator in the course of each horizontal blanking interval.

9. In a color television system wherein the total number of lines of the complete image is $2p+1$, where $p$ is an integer, and wherein the scanning is interlaced, a color television transmitter sub-carrier circuit comprising: means for generating a first wave having a frequency equal to a whole multiple of the line frequency; first phase splitting means having two outputs for deriving from said first wave two waves in phase opposition relative to each other; a first commutator having two signal inputs respectively connected to said two outputs, a control input and an output; means controlled by signals at the line frequency for generating a periodic rectangular wave, the period of which being equal to the duration of P scanning lines, P being an integer greater than 2 and being a divisor of $p$ if $p$ is an even number and of $p+1$ if $p$ is an odd number, each of the higher level portions and each of the lower level portions of said rectangular signal having a duration equal to that of a whole number of scanning lines; second phase-splitting means having two outputs for deriving from said first rectangular wave two rectangular signals in phase opposition relative to each other; a second commutator having two signal inputs respectively connected to said outputs of said second phase-splitting means, a control input and an output; means controlled by signals at the field frequency for generating a square wave, the higher and lower level portions of which all having a duration equal to that a field; means for applying said square wave to said control input of said second commutator; means for applying the output signal of said second commutator to said control input of said first commutator; and means for alternately modulating the output signal of said first commutator by two chrominance signals, the alternation taking place at the line frequency.

10. In a color television on system wherein the total number of lines of the complete image is $2p+1$, $p$ being an integer, and wherein the scanning is interlaced, a color television transmitter sub-carrier circuit comprising: frequency modulating means for providing a modulated sub-carrier wave alternately modulated by two chrominance informations, the alternation taking place at the line frequency, and means, coupled to said frequency modulating means, for imparting to said modulated sub-carrier wave a fixed phase at the beginning of each scanning line; first phase splitting means having two outputs for deriving from said modulated wave two waves in phase opposition relative to each other; a first commutator having two signal inputs respectively connected to said two outputs, a control input and an output; means controlled by signals at the line frequency for generating a periodic rectangular wave, the period of which being equal to the duration of P scanning lines, P being an integer greater than 2, and being a divisor of $p$ if $p$ is an even number, and a divisor of $p+1$ if $p+1$ is an odd number, each of the higher level portions and each of the lower level portions of said rectangular signal having a duration equal to that of a whole number of scanning lines; second phase-splitting means having two outputs for deriving from said first rectangular wave two rectangular signals in phase opposition relative to each other; a second commutator having two signal inputs respectively connected to said outputs of said second phase-splitting means, a control input and an output; means controlled by signals at the field frequency for generating a square wave, the higher and lower level portions of which all having a duration equal to that a field; means for applying said square wave to said control input of said second commutator; and means for applying the output signal of said second commutator to said control input of said first commutator.

11. In a color television system wherein the total number of lines of the complete image is $2p+1$, $p$ being an integer, and wherein the scanning is interlaced, a color television transmitter sub-carrier circuit comprising: oscillator means for generating a sub-carrier wave whose frequency is a multiple of the line scanning frequency, said line scanning frequency being derived through successive division from the oscillation generated by said oscillator; means for shifting by $\pi$ the phase of said sub-carrier wave during the scanning of at least one predetermined line of each successive group of P successive scanning lines, P being an integer greater than 2 and being a divisor of $p$ if $p$ is an even number and a divisor of $p+1$ if $p$ is an odd number; means for additionally shifting by $\pi$ the phase of said sub-carrier wave during the scanning of one out of two successive fields; and means for alternately modulating the thus phase shifted sub-carrier by two chrominance informations, the alternation taking place at the line frequency.

12. In a color television system wherein the total number of lines of the complete image is $2p+1$, p being an integer, and wherein the scanning is interlaced, a color television transmitter circuit comprising: a phase modulated oscillator for generating a modulated sub-carrier wave having a frequency equal to a multiple of the line scanning frequency, said line scanning frequency being derived through successive divisions from the oscillation generated by said modulated oscillator; means for shifting by $\pi$ the phase of said sub-carrier wave during the scanning of at least one; predetermined line of each successive group of P successive scanning lines, P being an integer greater than 2 and being a divisor of $p$ if $p$ is an even number, and a divisor of $p+1$ if $p$ is an odd number; and means for additionally shifting by $\pi$ the phase of said sub-carrier wave during the scanning of one out of two successive fields.

13. A method for reducing the visibility of the sub-carrier in color television systems wherein a sub-carrier is alternately modulated by two chrominance informations, the alternation taking place at the line frequency, the total number of lines of the complete image being $2p+1$, where $p$ is an integer, and the scanning being interlaced, said method consisting in assigning to the unmodulated sub-carrier wave a phase pattern repeating itself for each successive groups of P scanning lines, where P is an integer greater than 2 and is a divisor of $p$ if $p$ is even and a divisor of $p+1$ if $p$ is odd; modulating said sub-carrier wave by said chrominance signals; and reversing the phase of said modulated sub-carrier for the duration of one out of two successive fields.

14. A method for reducing the visibility of the sub-carrier in color television systems wherein a sub-carrier is alternately modulated by two chrominance informations, the alternation taking place at the line frequency, the total number of lines of the complete image being $2p+1$, where $p$ is an integer, and the scanning being interlaced, said method consisting in assigning to the unmodulated sub-carrier wave a phase pattern repeating itself for each successive group of P scanning lines, where P is an integer greater than 2 and is a divisor of $p$ is even and a divisor of $p+1$ if $p$ is odd; reversing the phase of said unmodulated sub-carrier wave for the duration of one out of two successive fields; and modulating said phase-shifted sub-carrier by said chrominance informations.

15. In a color television system wherein the total number of lines of the complete image is $2p+1$, $p$ being an integer, and wherein the scanning is interlaced, a color television transmitter circuit comprising in series: means for generating a wave whose frequency is equal to a whole multiple of the line frequency; amplitude-modulating means for alternately modulating said wave with two chrominance informations, the alternation taking place at the line frequency; and means for (i) shifting by $\pi$ the phase of said modulated sub-carrier wave for the respective durations of $v$ predetermined scanning lines in each of all the successive groups of P successive scanning lines, P being an integer greater than 2 and being a divisor of $p$ if $p$ is an even number and a divisor of $p+$ if $p$ is an odd number, $v$ being a positive integer smaller than P, and said $v$ predetermined lines occupying the same relative positions within each of said groups, and (ii) additionally shifting by $\pi$ the phase of said modulated sub-carrier wave for the duration of one field out of two successive ones.

References Cited by the Examiner

UNITED STATES PATENTS

| | | | |
|---|---|---|---|
| 2,666,806 | 1/54 | Kalfaian | 178—5.2 |
| 2,739,181 | 3/56 | Sleeper et al. | 178—5.2 |
| 2,870,248 | 1/59 | Valeton et al. | 178—5.2 |
| 2,912,492 | 11/59 | Hanntjes et al. | 178—5.2 X |

DAVID G. REDINBAUGH, *Primary Examiner.*

ROBERT SEGAL, *Examiner.*